Figure 2:
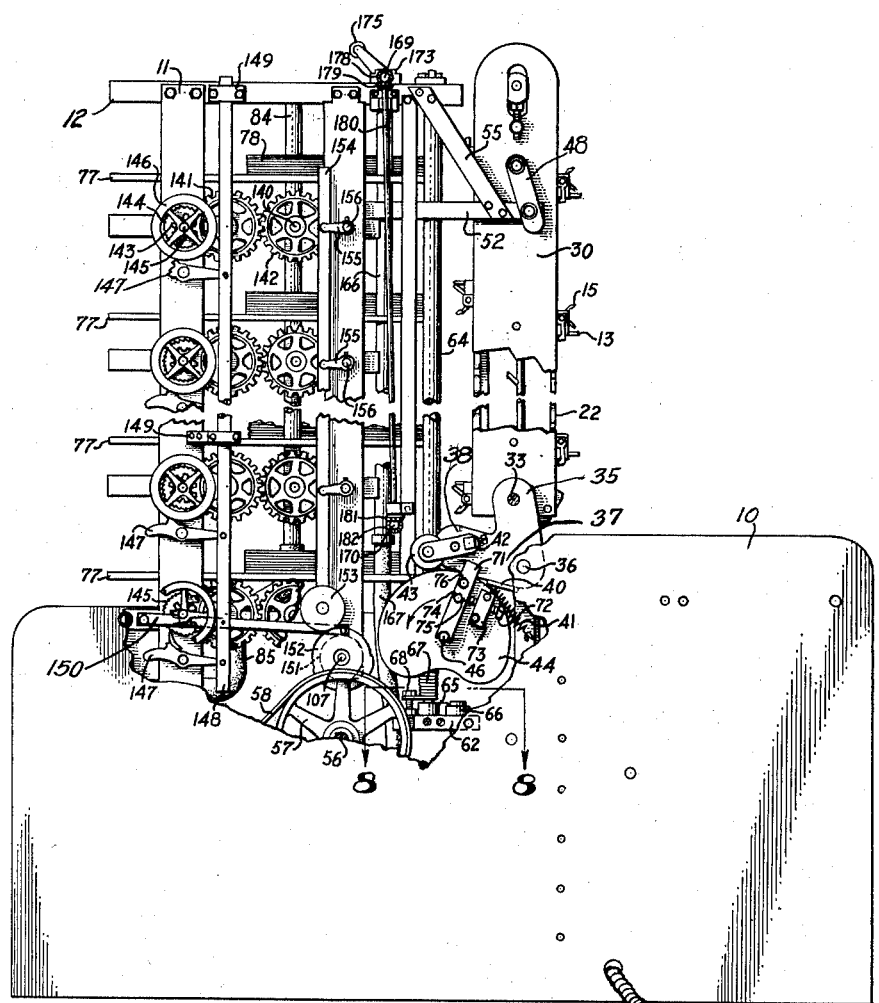

Jan. 2, 1951     A. DAGER     2,536,356
MANIFOLDING MACHINE
Filed Feb. 28, 1948     6 Sheets-Sheet 1
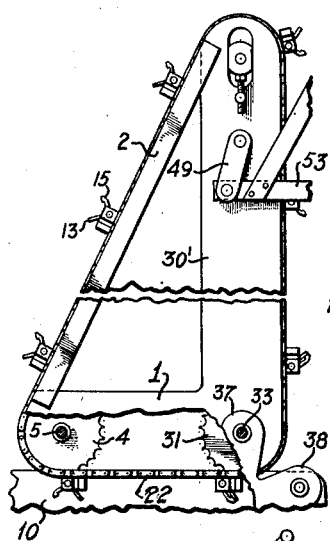
Fig. 17
Fig. 1
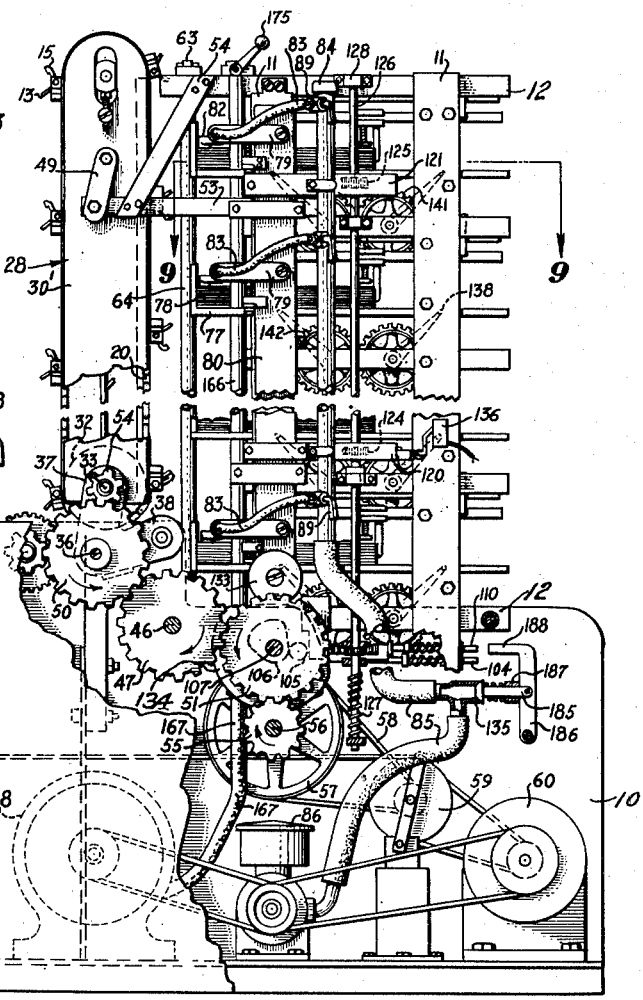
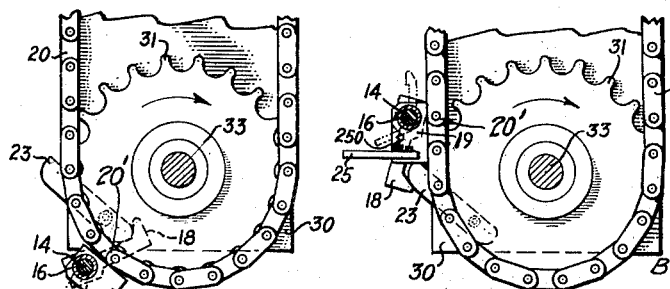
Fig. 6     Fig. 7
INVENTOR,
ALBERT DAGER
BY
ATTORNEY.

Jan. 2, 1951 A. DAGER 2,536,356
MANIFOLDING MACHINE
Filed Feb. 28, 1948 6 Sheets-Sheet 2

INVENTOR,
ALBERT DAGER
By
ATTORNEY.

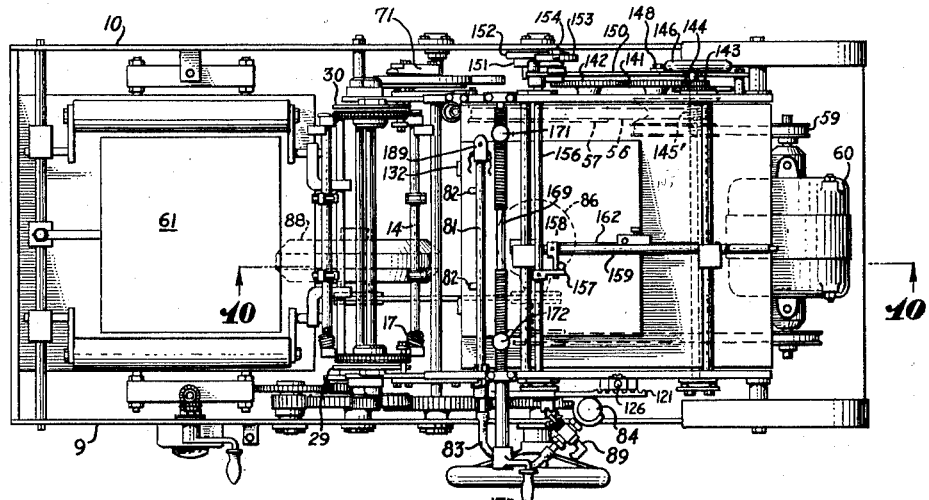
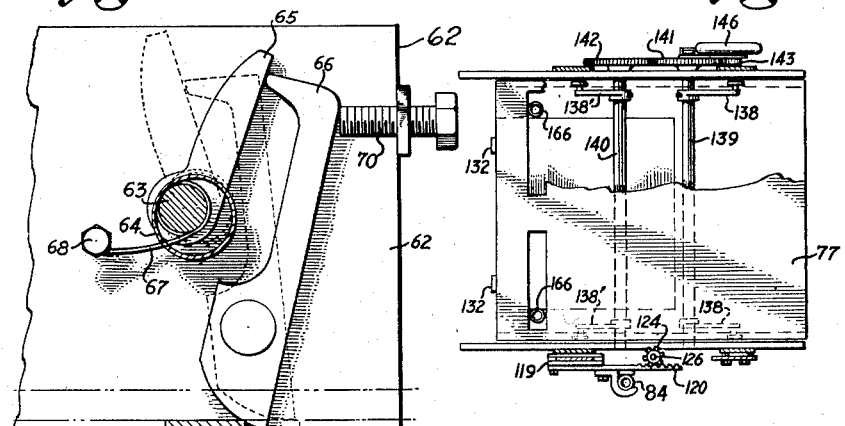
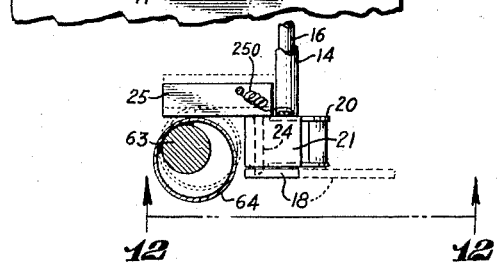
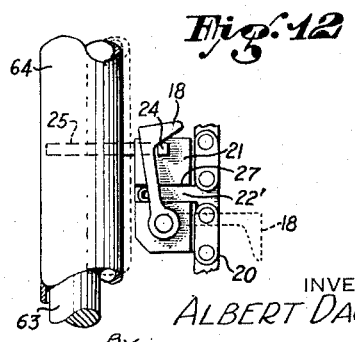
INVENTOR,
ALBERT DAGER

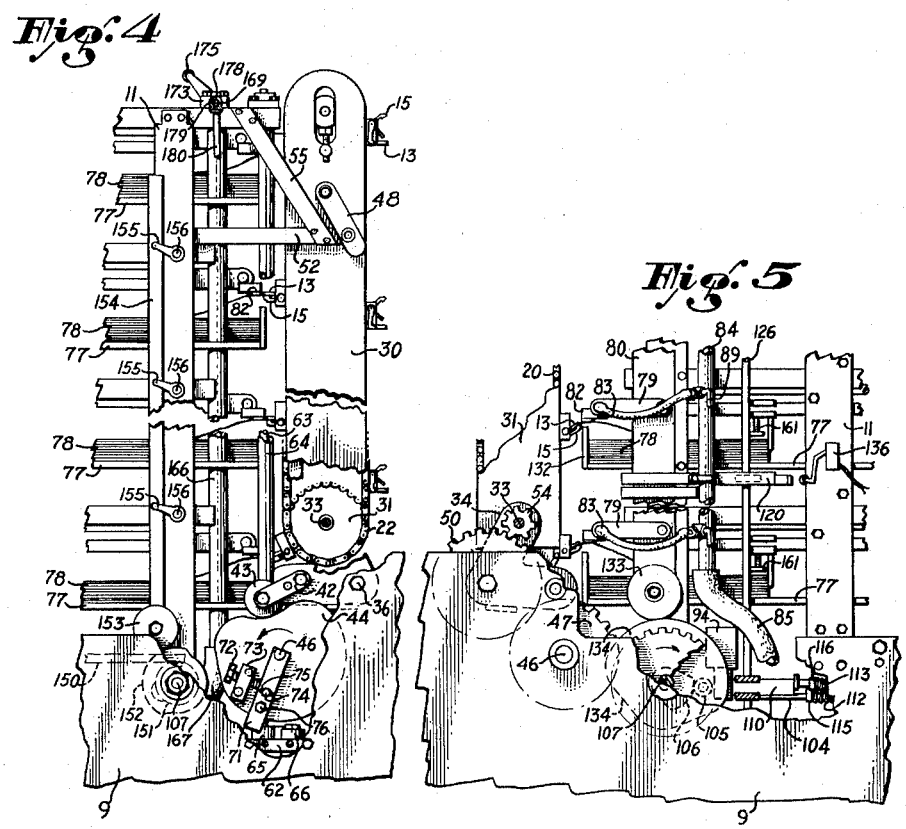
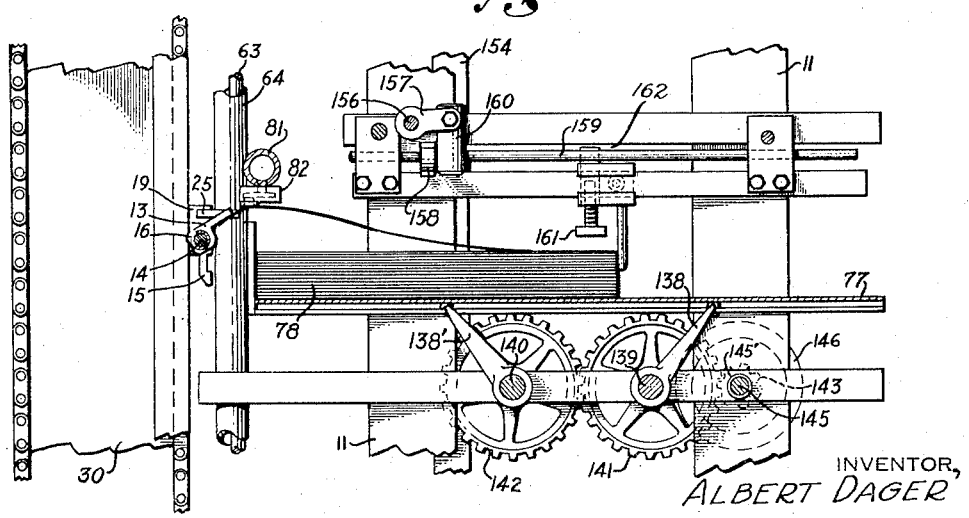

Jan. 2, 1951  A. DAGER  2,536,356
MANIFOLDING MACHINE
Filed Feb. 28, 1948  6 Sheets-Sheet 5

INVENTOR,
ALBERT DAGER
BY
ATTORNEY

Jan. 2, 1951  A. DAGER  2,536,356
MANIFOLDING MACHINE

Filed Feb. 28, 1948  6 Sheets-Sheet 6

INVENTOR,
ALBERT DAGER
By
ATTORNEY

Patented Jan. 2, 1951

2,536,356

UNITED STATES PATENT OFFICE 2,536,356

MANIFOLDING MACHINE

Albert Dager, Los Angeles, Calif., assignor of one-half to Elias Shaheen, Los Angeles, Calif.

Application February 28, 1948, Serial No. 12,037

11 Claims. (Cl. 270—58)

This invention relates to means for manifolding sheets or signatures of paper in a predetermined regular order, and it has especial reference to a machine for assembling sheets in multiplicate in a rapid manner, the prime object of the invention being to provide a machine by which the steady assembling and superpositioning of sheets may be effected speedily and automatically.

Other objects of the invention are to provide a machine in which sheets from separate stacks are predeterminably selected for removal therefrom, and delivered to carrier means in the order of their selection for subsequent individual superposition in the order required, whereby the gripping of sheets occurs simultaneously while the release of the sheets takes place in single sequence.

Another object of the invention is to provide a simple means for simultaneously gripping the edges of all the sheets that are to form the multiplicate pages of a book or part thereof, and then transferring them from the area of their selection separately to the area of their collection or collation.

Another object of the invention is to provide in a collating machine a mechanism in which a gripping means and delivery means coact with a predetermined interval of time in the movement of the gripping means to prevent injury to the sheets as they are simultaneously removed from the stacks.

Other objects will appear from the specification following in connection with the accompanying drawings showing certain embodiments of the invention, the formation, construction, association, and relative arrangement of parts, members, and features, as described in general, and more particularly pointed out in the claims.

Figure 16:
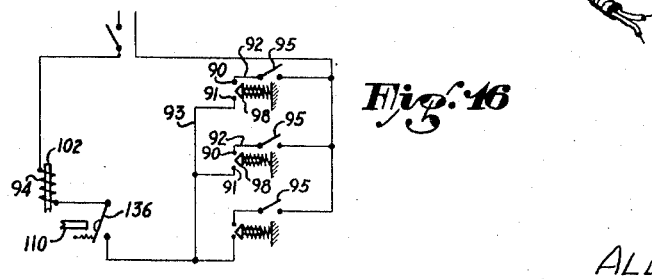
Figure 13:
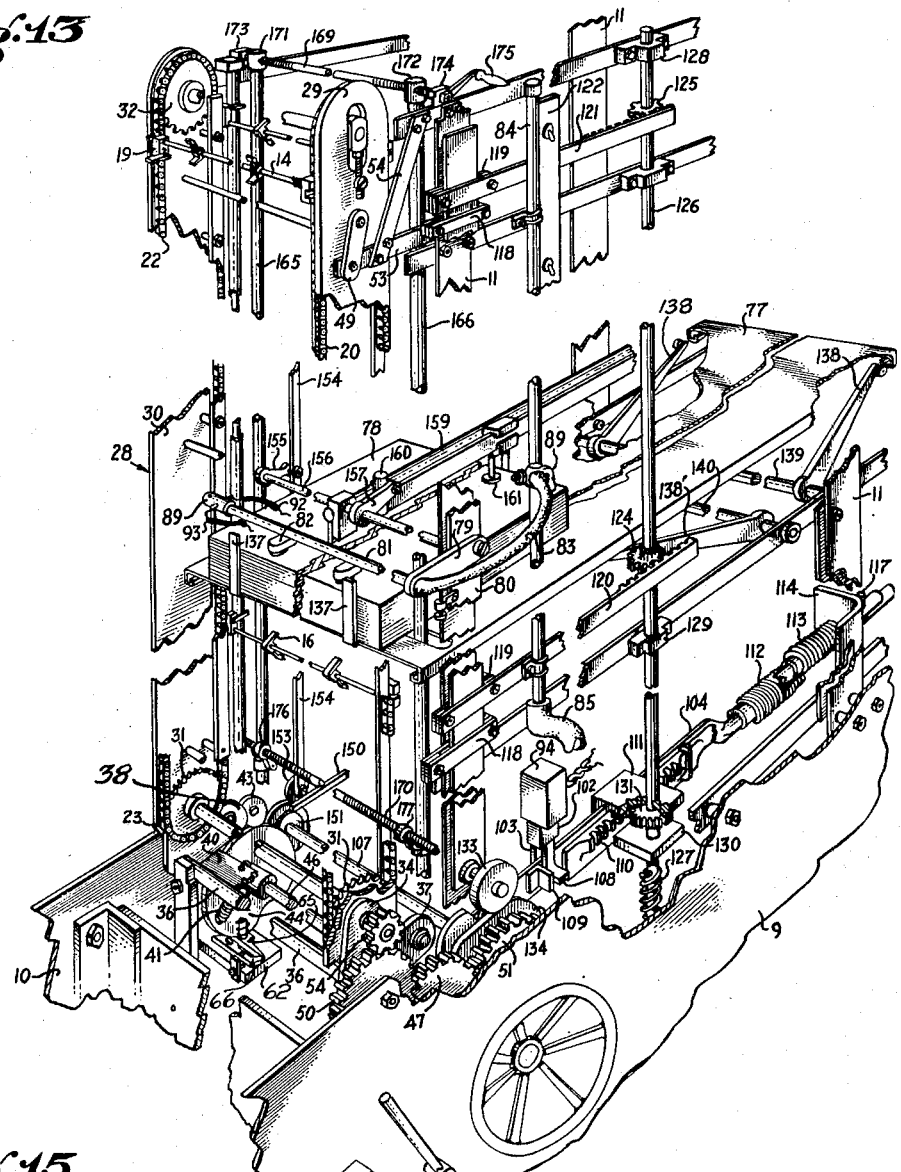
Figure 15:
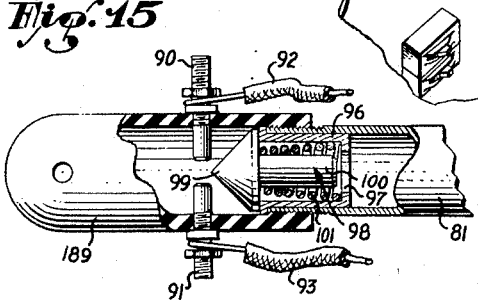
Figure 14:
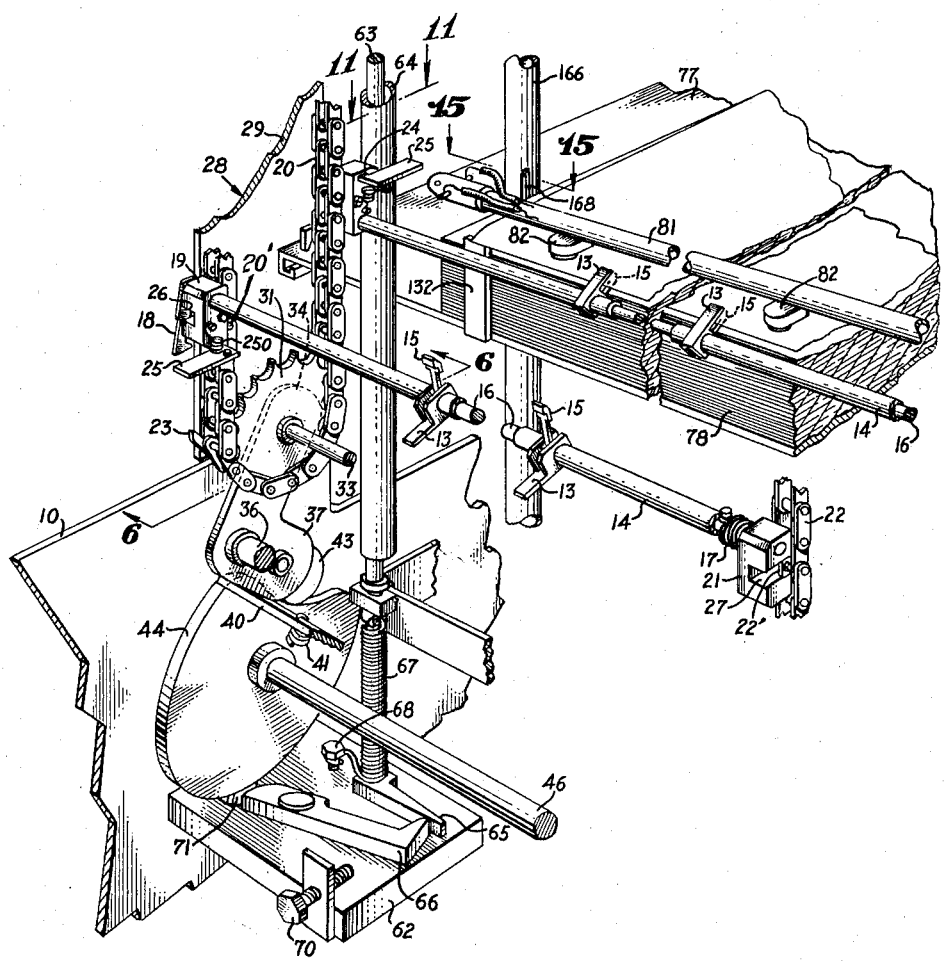

In the drawings:

Figure 1 is a side elevation of a machine embodying my invention, one of the side plates being broken to illustrate parts otherwise hidden, Figure 2 is a similar view looking from the opposite side of the machine, Figure 3 is a plan view, Figure 4 is a fragmentary side view of the machine, showing the paper grippers in operated position, Figure 5 is a fragmentary side view showing the grippers closed upon sheets of paper and the carriage for the grippers about to be moved relative to the paper stacks, Figure 6 is an enlarged fragmentary detail showing the gripper carrying chain, and one of the grippers in the position it occupies after releasing a sheet of paper, Figure 7 is a similar view showing one of the grippers moved to open position and the cam for effecting such movement, Figure 8 is an enlarged fragmentary plan section on line 8—8 of Figure 2, looking in the direction of the arrow, Figure 9 is a fragmentary, enlarged plan section on the line 9—9 of Figure 1, looking in the direction of the arrow, Figure 10 is an enlarged fragmentary sectional view on line 10—10 of Figure 3, showing the position of the grippers preparatory to closing upon the edge of a sheet of paper, Figure 11 is a horizontal enlarged fragmentary plan section on line 11—11 of Figure 14, showing the position of the trip mechanism preparatory to actuating the grippers, Figure 12 is a fragmentary elevational view of Figure 11, Figure 13 is an exploded perspective view showing the machine, Figure 14 is an enlarged fragmentary perspective detail showing the gripper mechanism, the release actuating means therefor, the carriage, and the mechanism for moving the carriage toward and away from the paper stack, Figure 15 is an enlarged sectional detail on line 15—15 of Figure 14, showing the electrical control device, Figure 16 is a diagrammatic view of the electrical circuit for controlling the actuation of the vacuum means, and, Figure 17 is a detached, side elevational view of a form of carriage modified to provide for the transportation of the sheets and deposit thereof at the end of the horizontal travel thereof relative to the table.

Referring in detail to the drawings, the foundation of the machine is shown as comprising spaced parallel plates or frames 9 and 10 upon which is erected a super-structure consisting of vertical and horizontal bars 11 and 12, respectively, combining with the base or foundation to form an integrated frame upon and within which the mechanism for accomplishing the purposes of the invention is contained, and which will be referred to as such throughout the following description.

A series of superpositioned gripping elements are employed, and each element comprises a stationary jaw 13 rigidly secured to a hollow shaft 14 and straddling a space or opening or cut-out in said shaft; and a movable jaw 15 in said opening or cut-out that is rigidly secured to a rod 16 passing through said hollow shaft 14. This rod and its complement, the hollow shaft, are horizontally disposed, as shown in Figures 10, 13, 14, 6 and 7, and the rod is under the tension of a torsion spring 17 on one end thereof and at the other end has a pawl 18 fixedly connected with it. Each rod is rotatable within its hollow shaft 14 (Figure 14), which journals in a block 19 that is associated with a link 20' on one of the endless chains 20; and the tubular body 14 is held stationary in another block 21, that is, companion to said first named block and is mounted on a link 22' of a companion chain 22 on the other side. By means of the pawl 18 on the end of the rod and engaging a cam 23, on the frame plate 30, Figures 1, 6, and 7, a trigger 24, Fig. 11, is set to hold the jaw 15 on the rotatable rod 16 open with respect to the fixed jaw 13 on the hollow shaft 14. This pawl 18 rotates the rod 16 a distance sufficient to open the movable jaw 15 as it is moved into engagement with the extended portion of the latch or trigger 24. Trigger 24 is moved from one side of pawl 18, against spring tension, to the other side, thereby to hold the jaws in open position against the torsional pressure of the spring 17 and the rod 16. The latch or trigger 24 is provided with an extension 25, on which is mounted a spring 250 that connects with the block 19 and maintains the trigger under tension and the jaws in relatively open position, Figures 10 and 14. Each of the blocks 19—21 heretofore referred to, is substantially a rectangular body provided with a slot 26 and 27, respectively, at one side for accommodating respectively the links 20' and 22' of the chains, as heretofore described. Each pair or set of the grippers are individually opened during traverse of the chains, in continuous succession to release one of a set of captured sheets or signatures, by the means just described and recapitulated as the pawl 18 on the end of the rotatable rod 16 and the trigger mechanism that is operable to hold open the gripper jaws.

The chains 20 and 22 as heretofore noted, carry the tubes and rods that form part of the gripper assembly, and also the latch mechanism by which the grippers are set and then released as later set out. These chains are contained and operate in a carriage 28 which includes a pair of parallel plates 29 and 30, sprockets 31 and 32, and said chains, and the gripper operating mechanisms already detailed, are pivotally mounted for a relatively small arcuate movement to present and move the open grippers to the edges of the sheet or signatures. For this purpose, each end of the lower arbor 33 on which are secured the sprocket wheels 31 and 32 is extended beyond the respective side plates of the carriage 28 and the ends are mounted on the ends 34 and 35 of bell cranks that are fulcrumed on a rod 36 secured to each side of the frame; while the other arms 37 and 38 of said bell cranks are connected together by a tie plate 40. The bell cranks, tie rod and plate constitute an integral rocking assembly that is always under the tension of springs 41 and tend to tilt forward the assembly. The bell crank leg 37 is provided laterally thereof with an adjustable arm 42 in which is rotatably carried a roller 43 that rides over and is held in constant contact with the periphery of a cam 44 by the springs 41, aforementioned. The cam 44 is keyed on one end of a shaft 46 supported in suitable bearings in the frame and mounts on the other end a gear 47 which meshes with gears 50 and 51, described later. The rotation of the cam 44 will, therefore, rock the crank assembly and in so doing will impart to the carriage an arcuate travel defined by the movement of the bell cranks. This positive movement of the carriage by the cams 44 is in a direction away from the edges of the paper, Figure 2. The movement toward the paper to grip same occurs when the roller 43 traverses the depression in the cam 44, the tendency of the carriage to move forward or toward the paper being in response to the spring tension.

In order that the carriage shall move in its arcuate path without variance in its vertical position, the side members 30 and 30' of the carriage, Figures 2 and 4, are provided near the top with links 48 and 49 that depend from and are pivotally connected to the plates. The lower end of said links are pivotally connected to horizontal bars 52 and 53 extending forward from the superstructure of the main frame and laterally of, but free of said plates, braces 54 and 55 being provided to stabilize these bars 52 and 53. The movement of the carriage as produced by the rocking mechanism, therefore, occurs without changing the relative vertical position of the carriage to the conveying instrument, later described, both of which, as stated, move forward toward each other, at one time to deliver sheets into the open jaws of the grippers and then move away from each other as the grippers are closed upon the paper.

It will be apparent that where terms of direction or position are used herein, they refer merely to those directions exemplified by and in the drawings, and it will be obvious that the relative movements of the carriage and delivery structure are preferably always parallel.

Inasmuch as it may be undesirable to continue the movement of the chains and the grippers immediately after the sheets have been caught therein, for the reason that the forced traverse of the sheets in very close proximity to the abutment plates of the shelves might damage them and render them unfit for use, means are provided to interrupt the travel of the chains for an interval during which the carriage recedes to initial position, as shown in Figure 1, and draws with it the gripped sheets or signatures while the chains are stationary.

On one end of the arbor 33, Figure 1, that is supported on the substantially upstanding arms 34 and 35 of the bell cranks and in turn supports the carriage, is mounted a pinion 54 that is in mesh with the large gear 50 which forms part of the train of gears including the gear 47 and the gear 51, the latter gear meshing with a pinion 55 on a shaft 56 carrying a sheave 57 that is connected by a belt 58 with variable speed sheave 59 that is suitably supported and is belted to a source of power, as an electric motor 60, Figure 1. Now, as the rocker mechanism pivots the carriage to a forward position, the pinion 54, which is radial to the gear 50, travels with it in planetary-wise and also axially over the teeth of the gear 50, the rotation of the pinion 54 to the limit of the downward movement of the rock arm assembly continuing, as do also the movement of the chains and its counterparts. When the rocker assembly is moved from its lowermost position by the cam 44 to the initial position, the pinion 54 is also moved bodily with the carriage but in the same direction as the rotation of the gear 50. There is, therefore, during this recessional movement, no rotation of the pinion 54 and hence no operation of the chains. The paper is, therefore, drawn beyond the ledges of the shelves a safe distance before the rotation of the chains is resumed to draw all the sheets gripped for superposition in multiplicate on the table 61 between the frame plates 9 and 10, Figure 3.

The gripper jaws, of whatever number employed in collating or manifolding, are collectively actuable to grip single signatures or sheets simultaneously, preparatory to depositing a series of such signatures or sheets in superposed relation, but the release of the individual sheets or signatures is effected in continuous succession as they are deposited in their proper arrangement of superposition. The release of the triggers 24 which hold the movable jaws 15 of the grippers in open position, to cause them to snap shut against the stationary gripper complements 13 with a sheet or signature interposed, is effected by an eccentric instrument journaled at the top in the upper part of the frame and at the bottom in a plate 62 (Figures 8 and 14), and common to all of the extensions 25 of said triggers 24. For purposes of this description, and for economy of manufacture, the instrument referred to for actuating the triggers 24 may be an elongated eccentric bar 63. The respective ends of said elongated eccentric bar are journaled as explained, and shown more clearly in Figures 3, 11, 12 and 14. On the lower end of the bar, and substantially flush with the plate 62, is secured a finger 65, Figures 8 and 14, that is normally held in engagement with one end of a lever 66 fulcrumed on said plate 62, by a torsion spring 67 that surrounds the end of the bar 63, and the ends of which are respectively secured to the rod and a post 68 threading in the plate. The spring maintaining axial torsion on the bar holds the finger 65 in engagement with the end of the lever 66 and hence, the eccentric tubular body in inoperative position, that is, out of the path of the extensions 25 of triggers 24 of the various units until a selected group is aligned with sheet edges when the eccentric instrument is oscillated to engage the selected series of triggers and release same to cause the jaws to grip the sheets or signatures.

Adjustable stop means 70 are provided on the plate 62 to limit the movement of the lever 66. The prehension of all of the sheets or signatures selectively assorted by the gripping elements occurs simultaneously as heretofore stated. The means whereby this eccentric instrument is oscillated against the tension of the spring 67 coiled about the bar 63 embodies an elongated lug 71 secured to and projecting beyond the periphery of the cam 44, Figures 2, 4 and 14, mounted on the shaft that journals in the frame side members and is operated by the gear 47 on the shaft 46, which comprises a unit or member of the train of gears operating in unison to effect the various operations of the machine. The lug 71 is adapted to strike against one end of the lever 66, Figures 3, 8 and 14, during the rotation of the cam 44, thereby forcing its longer end against the finger 65 and axially rotating the bar 63 to cause the eccentric to engage and trip the extensions 25 of said triggers 24 that hold open the gripper members. The engagement of the lug 71 with the lever 66 is obviously but momentary and disengagement thereof is followed immediately by a return to normal of the eccentric bar 63 and of the finger and the lever in response to the torsion of the spring 67. The lever is held in its inoperative position by the adjustable stop 70, Figures 8–14, as explained. In Figures 2 and 4, I have shown a means for adjusting said lug bar 71 to positions of varying radii for regulating the period of movement of the eccentric instrument and maintaining and regulating its operation in the accurate sequence required. This means includes an adjustable thrust screw 72, carried in a body 73 that is attached to the side of the cam 44 and having its free end in contact with the edge of the lug 71. This elongated lug 71, as seen, is stirruped at its inner end to straddle the shaft 46, the purpose of this structure being to render it easily removable. It is arcuately adjustable relative to the cam 44 by said thrust screw 72, a bolt 74 passing through an arcuate slot 75 in the lug, being manipulated to set the lug in adjusted position, in which it cooperates with the adjusting device to regulate the timing of the eccentric bar operation. The lug 71 is adjustable also relative to the face of the cam 44 to vary the position of contact thereof with the lever 66 and thereby control the extent of movement of the eccentric bar that operates to release the mechanism for the grippers. This adjustment comprises a bolt 76 that threadedly engages and passes through the lug 71 to bear against the face of the cam relative to which the lug is thereby adjustable.

Extending horizontally over each shelf 77 in which are carried the stacks 78 of sheets or signatures and connected at their outer ends to adjustable supports 79 extending or projecting from a movable carrier member 80, hereinafter described, are a series of pipes 81 on each of which are mounted a air of suction elements or feet 82 for lifting the upper sheet or signature from the stacks 78. These feet are provided with openings in the bottom which communicate with the interior of the pipes 81 that are respectively connected by flexible hose sections 83 to a suction line manifold 84 that is mounted on racks 120, 121, hereinafter described. The suction line manifold is connected by flexible hose 85 to a vacuum pump 86 (Figure 1) powered by the motor 60 that also operates a blower 88 for furnishing air to the sides of the stacks of paper 78, assembled on the trays 77, as later explained. The flow of air to each of the horizontal pipes 81 carrying the suction elements 82 is individually controlled by valves 89 (Figures 1 and 5) that are manually operable. One end of each of the suction feet-carrying pipes 81, as stated, is supported in an arm 79 pivotally associated with the carrier member 80. The free ends are covered by perforated insulated caps 189 that are provided with spaced electrical terminals 90 and 91 transversely penetrating the caps and included in an electrical circuit, diagrammatically shown in Figure 16, which also includes wires 92 and 93, the field 94 of a solenoid, a series of switches 95, and a source of power (not shown). In the end of each suction pipe 81 is inserted a hollow chamber 96 having an opening 97 communicating with the suction pipe interior and housing a plunger 98 having a conical head 99 for engagement with the aforesaid terminals 90 and 91. The head 99 of the plunger is part of stem 100, about which is coiled a helical spring 101 that tends normally to urge the plunger head 99 thereof into contact with said terminals. When suction is maintained within the pipes 81, the plunger head 99 is held seated against the outer edge of said chamber and hence out of contact with the terminals 91 and 92, and this occurs during the normal operation of alternately creating and interrupting the suction in the pipes, respectively, to lift and release a sheet or signature to the grippers. If, for any reason, the suction effect is interferred with, the plunger 98 will be released to respond to the tension of the helical spring 101, which forces the head into contact with the terminals 90 and 91. Thereby an electrical circuit is completed, which causes the armature 102 of the solenoid to lift. This solenoid is connected by a suitable support 103 with a bar 104, Fig. 13, that mounts a roller 105 which is in constant engagement with a cam 106 keyed or otherwise fastened on a shaft 107 which mounts the gear 51. The armature 102 of the solenoid is provided with a foot 108 that normally is interposed between the block 109 on the bar 104 and the end of a rack bar 110 that is parallel with said first named bar 104 and juxtaposed in relation thereto, a suitable guide 111 being provided to direct the travel of both the bar and rack in a rectilinear direction as presently detailed. The bar and rack are each under the tension of a spring 112—113, respectively, by which the cam roller 105 of the bar is maintained permanently in contact with the cam 106 and the ends of the bar and of the rack are mounted to reciprocate in a plate 114 that is connected to the frame, the said springs being interposed between the said plate 114 and collars 115 and 116, respectively, secured thereon. The forward movement of the rack 110 beyond the area occupied by the foot 108 when removed or lifted by the solenoid, is prevented by a pin 117, or other device that may conveniently engage the rack rod 110 which is preferably circular, and bears against the outside of the plate 114. As stated, the solenoid is a part of the bar 104 and hence travels with it. When the foot 108 of the solenoid is disposed between the end of the rack and the block 109, the movement of the bar 104 by the cam 106 engaging the cam roller 105, carries with it the rack 110 and thereby both the bar and rack are reciprocated for purposes presently appearing. When, on closing of the circuit, by contact of the cone head 99 of the plunger 98 with the terminals 90 and 91, the foot 108 connected with the armature 102 of the solenoid is withdrawn, the rack 110 under the spring influence, will remain stationary, while the bar 104 will continue to be reciprocated by the rotation of the cam 106. During such reciprocation, the block 109 is moved only into close proximity with the end of the rack 110 which remains inactive. The purpose of this bar and rack structure and the contemporaneous and relative movements, is respectively to advance the carrier member 80 with the sheets of paper or signatures captured by the suction feet 82 for convenient seizing by the grippers, and to hold the carrier member against advance movement when for any reason the suction in any one of the pipes fails. In the latter event, the electrical circuit is closed by the plunger and the foot 108 of the solenoid is lifted from the space between the block 109 and the end of the rack 110, which is held in fixed forward position by the pin 117. The continued operation or rotation of the cam 106 merely reciprocates the bar 104 but the rack 110 remains stationary until the interposition of the solenoid foot 108 between its end and the block 109 is effected gravitationally, or by spring action, as the circuit is interrupted by reestablishment of the vacuum in the pipes 81 and the suction feet 82.

The carrier assembly for the suction pipes and its suction feet consists generally of a vertical member 80 mounted at one side of the frame, to reciprocate vertically through guides 118 that are conected to the stationary plate 11 parallel with said movable member 80, and spaced therefrom, and companion to a rear frame plate 12. The guide 118 is of sufficient length to enable the carrier member 80 to travel horizontally for a short distance, Figure 13, as later explained. The vertically movable member 80 or carrier that supports the horizontal vacuum pipes 81 with their suction feet 82 is operable reciprocably through close fitting lower and upper guides 119 connected with a pair of horizontal racks 120 and 121 connected together by a vertical member 122 and supporting the vacuum line manifold 84, the vertical member containing a plurality of switches 95—one in each circuit, which includes the terminals 90 and 91 disposed in the caps 189 of the vacuum pipes 81, referred to.

In mesh with the horizontal racks 120 and 121 are pinions 124 and 125, respectively, that are keyed on a vertical shaft 126 tensioned by a torsion spring 127 which is journaled for rotation in suitable upper, intermediate, and lower bearings 128, 129, 130, forming parts of the frame. On the shaft 126 is also a pinion 131 that is in mesh with the aforementioned rack 110, Figure 13. It will be noted that the teeth of the rack 110 that cooperates with the bar 104 are outwardly directed while the teeth of the two upper racks 120, 121 are inwardly directed, so that a rearward movement of the main rack 110 through the agency of the cam 106 rotates the shaft and the pinions thereon clockwise, thereby producing a forward movement of the upper and intermediate racks that are in mesh with the upper and intermediate pinions. Obviously, a reverse movement of the upper and intermediate racks 120 and 121, that is, rearwardly, occurs when the main rack 110 is moved forward under the tension of the springs 112, 113. The forward movement of the upper and intermediate racks moves forwardly the vacuum pipes-carrying member 80 to deliver a captured sheet or signature to the grippers. However, since the sheets or signatures are arranged in stacks or piles on separated shelves 77, that are adjustably mounted, and the ends of the sheets or signatures are arranged against abutment plates 131 that are permanently secured to a portion of the frame, it is necessary that the suction or vacuum feet for engaging and lifting the respective sheets in continuous sequence be elevated after the sheet is attached to the feet, which attachment occurs rearwardly of the front edge of each sheet a short distance, for the essential purpose of carrying the sheets over and beyond the ledges of the shelves and presenting the free edges thereof to the grippers 13 and 15, which, as later set out, are caused to be operated by the hereinbefore described cam or eccentric rod 64 to grip the presented edges of the respective sheets. This requires that the sheets be elevated above the top of the abutment plates to be presented to and within the open jaws of the grippers and since the vacuum pipes 81 are connected to the movable member 80, this member is mounted for elevation relative to the guides 118. For this purpose, it is provided with a roller 133 that rides the periphery of a cam 134 that is keyed on a shaft 107, journaled in the frame, by which cam the member 80 is elevated and then, following the periphery of the cam, returns to initial position. The forward movement of the member 80 follows the upward movement thereof for the sequential operation of lifting the sheets and disposing the edges thereof in the open jaws of the grippers simultaneously. If now there is a failure of the vacuum in any of the pipes carrying the suction feet, the plunger 98 in the particular cap affected, will contact the terminals 90 and 91 therein and close an electrical circuit to the solenoid, the armature 102 of which is lifted and carries the foot 108 from between the end of the rack 110 and the block 109. Thereby the rack 110, companion to the bar 104, remains stationary, while the bar 102 continues to reciprocate under the action of the cam 106. There is, therefore, no forward movement of the member or carrier 80, but the vertical reciprocation of the member continues, as does also the maintenance of a vacuum in the other pipes sufficient to hold the sheets in contact with the feet.

Referring to the multiple switch-carrying bar 122 and the manifold vacuum pipe 84 from which stem the various vacuum pipes 81, it will be seen that when all of the switches 95 are closed, and all of the valves are open, the operation of lifting each top sheet or signature from the stacks of the various shelves occurs in normal sequence, namely, to close the vacuum valve 135 to move the vacuum feet upward and forward, to open the vacuum valve to release the sheets held to the feet, and to return the vacuum pipes to normal initial beginning. When the vacuum valve 135 is opened and sheets are delivered to grippers 13, 15, and the condition of vacuum in the pipes no longer exists to hold the plunger 109 away from the terminals 90, 91, the circuit would ordinarily be closed at once to the solenoid and the foot 108 removed from between the end of the rack 110 and the block 109. This would cause the solenoid foot to pull against the pressure of the rack bar 110 and the block 109 and damage the solenoid. However, to prevent this, so that no possible interruption shall occur during a normal operation of the machine, the necessary intermittent or predetermined relief of the vacuum in the pipes 81, while permitting the plungers to contact the terminals 90 and 91, will not thereby close the circuit to the solenoid, because of an auxiliary switch 136 in the circuit, which is adapted to be operated by the rack bar 120 when moving rearwardly to close the circuit, but breaks the circuit when the bar moves forwardly. The closing of the vacuum valve 135 occurs simultaneously with the downward movement of the carrier member 80. Hence, during the forward movement of the suction feet, the rack 120 opens the switch and the circuit in which it is included to prevent thereby the energization of the solenoid. It will be apparent that when any one or more of the valves on the air manifold are closed and also the switches that are companions to these valves, are open, the conveyance of the sheets or signatures may be selectively controlled and this is important where the collation of them is intended to be limited to less than a maximum provided by the design of the machine.

The sheets or signatures are arranged in stacks, and the stacks are respectively supported on superposed shelves 77 between the frame sides. These shelves are adjustable automatically as the stack diminishes in the course of collation to cause the upper sheets of each stack to maintain a substantially fixed distance from the suction feet and thereby to avoid a pick-up failure. These shelves 77 are shown supported by two pairs of arms 138 and 138' which are secured to oppositely disposed shafts 139 and 140 journaled in the frame and mounting at an end thereof intermeshing spur gears 141, 142, one of which is meshed with a pinion 143 forming a counterpart of a ratchet wheel 144 fixed to an axle 145 in the frame and carrying a handwheel 146 by which the adjustment of the arms 138, 138' may be effected manually. These arms 138, 138' are substantially cranks and are angularly disposed relative to each other in opposite directions and engage the under side of the tables or shelves laterally. Each ratchet wheel axle 145 is under the tension of a torsion spring 145', which comes into play to revolve the shafts 139, 140 and operate the shelf moving arms 138, 138' when the ratchet wheels 144 are respectively released by operation of pawls 147, Figure 2, and these pawls 147 are fulcrumed on the frame and are pivotally connected to a bar 148 that is vertically movable in guides 149 connected to the frame by a horizontal lever 150 to which said bar is intermediately pivoted. One end of the lever 150 is pivoted on the frame and the free end rides upon a cam 151, Figure 13, Figure 2, that is secured upon the horizontal shaft 107 journaled in the frame and mounting on the other side or end thereof the aforedescribed cams 106 and 134 with which the roller 105 on the bar 104 is in engagement to be operated thereby. A companion cam 152 is mounted on said shaft 107 and is diametrically larger, as seen in Figure 2. Upon the periphery of this larger cam rides a roller 153, rotatably mounted on the lower end of a bar 154 that is parallel to said first-named bar 148. By means of a series of cranks 155 pivoted to said bar and pinned or otherwise secured to the ends of shafts 156, Figure 2, journaled in the frame, these shafts are oscillated as the bar 154 is moved by the cam 152. The horizontal shafts 156 mount crank arms 157 that are connected by links 160 with similar crank arms 158 on transverse shafts 159 suitably supported above the surface of the tables or shelves. The operation of the transverse shafts 159 by the respective upward movements of the crank arms 157, 158 occurs counter-clockwise and in so doing moves regulator 161 to a position which the top sheet of the stock should occupy. The transverse shafts 159 for this purpose are furnished with longitudinal flat keys or splines 162 (Figures 3, 10), the movement of which, with the rotation of the shafts 159, is translated to the regulators 161. Immediately succeeding the operation of this regulator 161, the bar 148 is actuated by the cam 151 to release the pawls 147 from engagement with the ratchet wheels 144, whereupon the torsion springs 145' rotate the pinion axles 145 whereby the lifting arms 138, 138' are moved against the tables or shelves 77 and elevated to cause the top of the paper stack to move into contact with the regulator 161 disposed in a previously set position. This position is the one which the stack should occupy for the vacuum feet to engage. The regulator is then returned to normal position by the reverse oscillation of the transverse shaft 159, as the cam 152 causes the bar 154 to drop in following the periphery of said cam 152. This action is preceded by a movement of the lever 150 that is operated by the smaller of the companion cams 151 to move said parallel bar 148 downwardly, thereby to cause the pawls 147 to re-engage the ratchet wheels 144. The immediate purpose of this mechanism and the operation ensuing is to maintain the stock of the paper stack at such height that the suction feet will always seize the topmost sheet.

It will be observed, as hereinbefore described, that the movement of the individual sheets or signatures occurs in an upward and forward direction, the movements being sequential in order to lift the top sheet or signature from the stack and then to move it into the mouth of the open jaws or grippers, thereupon operated to close and seize the presented edge of the paper, as explained. The grippers, therefore, have a forward movement contemporaneously with the forward movement of the sheets by the mechanism and in the manner previously described. (The term "forward" applies to the point at which sheets and gripper jaws meet for engagement.)

Means are provided to maintain in alignment the lateral edges of the sheets or signatures 78 of the various superposed stacks, and also to facilitate the separation and the elevation seriatim of the individual sheets or signatures by the suction devices alluded to heretofore. An example of these means is illustrated in greater detail in Figure 13 and embodies vertically disposed pipes 165, 166 positioned at the respective sides of the paper stack. These pipes are closed at one end and at their other ends are connected by means of flexible hose sections 167, Figure 4, to the blower 88. Each pipe, substantially adjacent each stack of sheets, is longitudinally slitted, as at 168, Figure 14, whereby a stream of air is continuously directed against the sides of the paper. These pipes 165, 166 are respectively movable into close proximity to or into contact with the lateral stack walls and their movement is implemented by horizontal rods 169, 170 which are provided with right and left hand threads. The rod 169 is extended through heads 171 and 172, respectively, on said pipes 165, 166 and the ends of said rod 169 are supported for rotation in bearings 173, 174 secured to the superstructure of the frame. To one end of the rod 169 is fixed a crank 175 by which the rotation of the rod 169 and thereby the movement of the pipes 165, 166 relative to each other and to the edges of the stack is effected. The rod 170 which parallels the rod 169 is synchronously operated with the rod 169 and for this purpose, mounts thereon heads 176, 177 that are respectively connected with the vertical air pipes 165, 166. To the end of the rod 169 is keyed a vertical bevel gear 178, that is in mesh with a horizontal bevel gear 179 on one end of a shaft 180. On the other end of the shaft 180 is keyed a horizontal bevel gear 181 that meshes with a vertical bevel gear 182 secured to the rod 170. Thus, by operation of the crank 175, the vertically positioned air pipes 165, 166 are operated by the left and right hand threaded rods 169 and 170, toward or away from each other, and hence toward and away from the lateral edges of the paper stock.

The vacuum valve 135 is provided with a stem 185, the end of which is pivotally connected centrally of and to a lever 186 pivoted at one end to one side plate 9. This lever 186 is spring-held normally against a stop 187, in which position the free end 188 of said lever is disposed in line with the movement of said rack 110, by which it is operated to open the vacuum valve 135 when said rack moves rearwardly and the paper is thereby carried forwardly. This opening of the valve 135 is timed to occur simultaneously with the gripping of the edges of the sheets by the gripping jaws.

Heretofore, I have described the carriage 28 as composed of a pair of parallel plates 29 and 30, between which is mounted the mechanism by which the grippers are conveyed from one location to another for the purposes set forth. Where the stock is thin and hard to handle, the collation or regular imposition of one sheet upon another in the required sequence might be interfered with because the gravitational travel of very light stock, as onionskin, carbon paper, etc., when released from the grippers would be considerably retarded by a buoyant atmosphere and thereby the sheets, or some of them, would be collected in loose disorder or in other than the flat form required. This is owing chiefly to the fact that momentum would be depended upon to carry the released sheets to their point of final deposit, beyond the point of release from the grippers. In Figure 17, I have illustrated a design of carriage by which the release of the sheets is effected at the end of a horizontal travel relative to the table 61, whereupon the assembly of the sheets takes place.

In that design, the carriage embodies the same elements as parallel plates 29 and 30, that are mounted as herebefore described; but at the bottom of each plate and extending therefrom are arms 1 that are rigidly secured to the bottom of the plate and are held substantially in a horizontal plane by reinforce braces 2. At their free ends, these arms 1 are connected with the top of the plates 29 and 30 by said angled reinforce braces or struts 2. In this form, the sprocket arrangement includes an additional one 4, secured on a shaft 5 that is journaled in the ends of each said arm 1, the shaft 5 being in the same horizontal plane as the shaft 33 on which the sprockets 31 are mounted. The travel of the chains 29 and 22 over the sprockets 4 and 31 is substantially in a horizontal plane. Therefore, after a selected group of the grippers have been actuated to grip a selected group of sheets, they are carried to the extreme end of the table 61 before being released individually, and at this point, they are successively deposited upon the table of previously collated stock, gravitationally in a straight line, which is vertical in this instance, and without impedance.

In operation, stacks 78 of paper or other material, are placed on shelves 77 that are supported for adjustment relative to a plurality of series of vacuum feet 82. These feet are mounted to be moved into engagement with the top sheet of each stack and then to be operated in an upward and forward direction to carry the edge of the top sheet over and beyond the shelf abutments to present the free front edges of the sheets to a series of traveling grippers which are selectively operated to close upon the paper edges to grip a selected group of the sheets so presented. It will be apparent from the foregoing description, that a selected group or series of these grippers is continuously operated to grip simultaneously a series of sheets while in motion but that the sheets are individually released to the stack of manifolds on the receiving table. The grippers and the assembly, of which they constitute a part, after closing on the paper edges, move away from the stacks or shelves, in order to draw the sheet-edges away a distance sufficient to prevent injury to them when the travel of the grippers is resumed, their travel having been interrupted during this recessional movement.

I claim:

1. In a device as disclosed: means supporting a plurality of stacks of paper in separated spaced relation, pneumatic means to lift the top sheet of each stack, means to move said lifting means to carry the sheets so lifted forward and away from the stack, a plurality of gripper means, a carriage, chain and sprocket means on said carriage supporting said gripper means in spaced relation corresponding to the spacing between the stacks of paper, means to operate said chains and thereby carry the gripper means relative to the sheets move forward, means to move said carriage toward the lifted paper, means to operate said gripper means to grip the edges of the sheet when so moved forward, means to interrupt the movement of said chains when the gripper means is in sheet engagement, means to move said carriage and gripped sheets away from the stack and simultaneously interrupt the travel of said chains when so moved, and means to operate said gripper means sequentially to release a gripped sheet.

2. In a device as disclosed: means supporting stacks of paper in spaced relation, means to remove the top sheet from each of said stacks, a frame, a carriage movable relative thereto, an endless chain mounted to travel on said carriage, a plurality of gripper elements mounted on said chain and spaced apart in accordance with the spacing of the stacks of paper, mutually cooperating means on said frame and chain to open said gripper elements during the travel thereof, means to move said carriage toward the respectively removed top sheets of each stack to present the edges of the sheets so removed to the open gripper elements, means to close said gripper elements upon the paper edges, said carriage movable away from the stacks with the paper gripped, means to interrupt the travel of said gripping elements during such latter movement of said carriage, and means for releasing the sheets from the gripper elements so that a collated stack may be formed.

3. In a machine of the type disclosed, a plurality of spaced shelves having front abutments for stacks of paper, pneumatic means to engage the top sheet of each stack, a carrier for said penumatic means, a frame, a carriage mounted for movement upon said frame, a plurality of gripper elements spaced apart in accordance with the spacing between stacks of paper on said carriage movable in endless sequence relative thereto, means to move said carrier upwardly and forward and thereby cause the edges of the respective sheets to be projected beyond said abutments, means to move said carriage toward said projected edges, means to operate said gripper elements to close upon said edges, said moving means being adapted to move said carriage away from the abutments with the sheets of the respective stacks gripped and simultaneously to interrupt the travel of said gripper elements, and means for releasing the sheets from the gripper elements so that a collated stack may be formed.

4. In a machine of the type disclosed, a plurality of superposed shelves for stacks of sheets, said shelves having abutments for aligning the front edges of the stacks, pneumatic means to engage the top sheet of each stack, a carrier for said pneumatic means, means to move the carrier upwardly and forwardly to project the sheets beyond and free of the abutments, a frame, a carriage movable relatively thereto, an endless chain and sprocket mechanism on said carriage provided with a series of spaced gripper elements, means to operate said chains, said endless chains having a straight course of travel in proximity to the sheet edges, means to move said carriage forward to align the gripper elements with the projected edges of the sheets, means to operate said gripper elements to grip the sheets, said carriage being movable rearwardly to draw the gripped sheets away from the abutments, and means for releasing the sheets from the gripper elements so that a collated stack may be formed.

5. In a machine of the type disclosed, a series of superposed shelves having abutments, the shelves adapted to hold stacks of paper, means to lift the top sheet of each stack and carry it above and beyond the abutments, a carriage, a series of spaced gripper elements, endless chains to which said gripper elements are secured, sprockets journaled in said carriage and mounting said chains, a driving gear, a pinion on said carriage radial to and in mesh with said gear for driving said sprocket and chain, said endless chains having a straight course of travel adjacent to the sheet edges a rocking assembly including an axis upon which said carriage is mounted, the said driving gear being coaxial with the rocking axis of the carriage and means to operate said rocking assembly in one direction to move the carriage forward and the gripper elements into engagement with the paper edge and in another direction to move the carriage and pinion rearward whereby during each rearward movement the travel of the gripper elements is interrupted, and means for releasing the sheets from the gripper elements so that a collated stack may be formed.

6. In a machine of the type disclosed, a series of superposed shelves adapted to hold stacks of paper, means to lift the top sheet of each stack and carry it beyond the front edge thereof, a series of gripper means, a carriage, endless chains on said carriage on which said gripper means are mounted in spaced relation corresponding to the spacing between the stacks of paper, means to cause travel of said chains, the chains having a straight course of travel adjacent the sheet edges, means to move the carriage forward to cause the gripper means to grip the front edges of selected sheets, and rearward to draw forward the gripped sheets and simultaneously interrupt the travel of said chains and the gripper means thereon, and means for releasing the sheets from the gripper means so that a collated stack may be formed.

7. In a machine of the character disclosed, a series of superposed shelves adapted to hold stacks of paper, means to lift and carry the top sheet of each stack beyond the front edge thereof, a carriage, endless chains on said carriage provided with a series of spaced apart gripper means the spacing corresponding to the spacing between the stacks of paper, a pinion on said carriage for operating said chains, a driving gear meshing with said pinion, said endless chains having a straight course of travel adjacent the sheet edges, a mount for said carriage, means to rock said mount in one direction to move the carriage to cause the gripper means to engage the paper edges, means to operate a selected group of said gripper means simultaneously to grip a selected group of sheets, said carriage being rockable in the opposite direction to draw the gripped sheets away from the stacks and the pinion relative to said driving gear whereby the chains are intermittently held inoperative, and means for releasing the gripper means from sheet engagement whereby a collated stack thereof may be formed.

8. In a machine of the character disclosed, a plurality of superposed shelves for supporting stacks of paper, pneumatic means for picking the top sheet of each stack, a carrier for said pneumatic means, a cam for elevating said carrier, a cam for moving forward said carrier simultaneously with the elevation thereof to elevate said pneumatic means and move forward the top sheets of the stacks, a frame, a rocker pivoting on the frame, a carriage mounted on said rocker and having chains and sprockets, a driving gear coaxial with the rocker axis of the carriage, a pinion on said carriage in mesh with said gear to drive said chains, a plurality of gripper means carried by said chains in spaced relation, said chains having a straight course of travel adjacent the sheet edges, means to operate said rocker in one direction and move forward the carriage to cause the gripper means to grip the edges of the forwardly moved paper, means to operate said rocker in another direction to move the carriage with the gripped paper away from the stack and the pinion relative to the gear to interrupt the travel of said chains during such movement, and means to release the sheets from the gripper means in continuous succession so that a collated stack may be formed.

9. In a machine of the character disclosed, a frame, a series of superposed shelves for supporting stacks of paper, pneumatic means for lifting the top sheet from each stack and projecting it beyond the front edge thereof, a carriage, shafts journaled in said carriage, and mounting sprockets for endless chains, a pinion on one of said shafts, a driving gear in mesh with said pinion, a rocker pivoted on said frame and supporting said carriage, a plurality of gripper means carried by said chains in spaced relation, means to pivot said rocker to move said carriage forward and the gripper means into gripping position, means to operate a selected group of said gripper means when so moved forward, means to pivot said rocker to move the carriage and gripped sheets rearward and effect bodily movement of said pinion relative to the rotating gear to interrupt the travel of said chains, and means for releasing the sheets from the gripper means so that a collated stack may be formed.

10. In a machine of the character disclosed, a frame, a series of superposed shelves for supporting stacks of paper, pneumatic means for lifting the top sheet from each stack and projecting it beyond the front edge thereof, a carriage, a sprocket and chain assembly journaled to travel in said carriage, a pinion and gear to drive said chain, a series of equally spaced gripper means carried by said chain, means on said frame and gripper means and mutually engageable to open said gripper means during the travel thereof, means to move the carriage forward to align a selected group of said open gripper means in gripping position, means to operate said selected group of open gripper means to grip the projected edge of the paper, means to move the carriage away from the stack with the paper gripped and simultaneously interrupt the travel of said gripper chains during such movement, and means to release the sheets from the gripper means in continuous succession so that a collated stack may be formed.

11. In a machine of the type disclosed, a frame, a plurality of shelves supporting stacks of paper to be manifolded, adjustable pneumatic means for engaging the top sheet of each stack, a bar on which said pneumatic means is mounted, a cam to lift said bar, a cam to move said bar forwardly substantially synchronously with the elevation thereof thereby to lift and move the top sheet from and project it beyond the front edge of each stack, a carriage, shafts journaled in said carriage, sprocket and chain means mounted on said shafts, a pinion on one of said shafts, a gear in mesh with said pinion to drive said sprockets and chains, a rocker on which said carriage is pivoted, said rocker journaling in the frame for oscillatory movement, a cam, springs to hold said rocker in engagement with said cam, said cam being rotatable to tilt said rocker in one direction to move the carriage toward the projected paper, and in another direction away from the stacks, said pinion being moved with respect to the gear and bodily with the carriage and in the same direction as the direction of rotation of said gear, thereby to interrupt the travel of said chains during such reverse movement, and gripper means carried by said chains and singly operable to open position at one time and severally operable to closed position at another time.

ALBERT DAGER.

REFERENCES CITED

The following references are of record in the file of this patent:

UNITED STATES PATENTS

| Number | Name | Date |
|---|---|---|
| 1,432,890 | Neely | Oct. 24, 1922 |
| 1,579,469 | Cooper | Apr. 6, 1926 |
| 2,308,804 | Dager | Jan. 19, 1943 |
| 2,389,066 | Leifer | Nov. 13, 1945 |
| 2,402,442 | Perry | June 18, 1946 |

FOREIGN PATENTS

| Number | Country | Date |
|---|---|---|
| 641,757 | Germany | Feb. 12, 1937 |